(12) United States Patent
Farroni et al.

(10) Patent No.: US 7,062,137 B2
(45) Date of Patent: Jun. 13, 2006

(54) FIBER OPTIC ARTICLE INCLUDING FLUORINE

(75) Inventors: Julia A. Farroni, Windsor, CT (US); Upendra H. Manyam, Hartford, CT (US); Nils Jacobson, North Granby, CT (US); Kanishka Tankala, South Windsor, CT (US); Adrian Carter, Bulli (AU)

(73) Assignee: Nufern, East Granby, CT (US)

( * ) Notice: Subject to any disclaimer, the term of this patent is extended or adjusted under 35 U.S.C. 154(b) by 107 days.

(21) Appl. No.: 10/912,666

(22) Filed: Aug. 5, 2004

(65) Prior Publication Data

US 2006/0029344 A1   Feb. 9, 2006

(51) Int. Cl.
*G02B 6/02* (2006.01)
*G02B 6/00* (2006.01)

(52) U.S. Cl. ....................... 385/123; 385/141
(58) Field of Classification Search ........ 385/122–126, 385/140–141, 147; 372/6; 359/341.1, 341.5
See application file for complete search history.

(56) References Cited

U.S. PATENT DOCUMENTS

| | | | |
|---|---|---|---|
| 3,599,114 A | 8/1971 | Snitzner | |
| 4,666,247 A | 5/1987 | MacChesney et al. | |
| 5,225,925 A | 7/1993 | Grubb et al. | |
| 5,259,046 A | 11/1993 | DiGiovanni et al. | |
| 5,485,480 A | 1/1996 | Kleinerman | |
| 5,530,710 A | 6/1996 | Grubb | |
| 5,930,436 A | 7/1999 | Okamura et al. | |
| 5,937,134 A | 8/1999 | DiGiovanni | |
| 6,043,930 A | 3/2000 | Inagaki | |
| 6,175,445 B1 | 1/2001 | Desthieux et al. | |
| 6,181,465 B1 | 1/2001 | Grubb et al. | |
| 6,278,816 B1 | 8/2001 | Keur et al. | |
| 6,385,384 B1 | 5/2002 | Wei | |
| 6,411,762 B1 | 6/2002 | Anthon et al. | |
| 6,459,846 B1 | 10/2002 | Choi et al. | |
| 6,463,201 B1 | 10/2002 | Aiso et al. | |
| 6,477,307 B1 | 11/2002 | Tankala et al. | |
| 6,483,974 B1 | 11/2002 | Waarts | |
| 6,496,301 B1 | 12/2002 | Koplow et al. | |
| 6,512,879 B1 | 1/2003 | Beguin et al. | |
| 6,516,124 B1 | 2/2003 | Po | |

(Continued)

OTHER PUBLICATIONS

U.S. Appl. No. 10/911,812, filed Aug. 5, 2004, Farroni et al.

(Continued)

*Primary Examiner*—Akm Enayet Ullah
(74) *Attorney, Agent, or Firm*—Peter J. Rainville

(57) ABSTRACT

A fiber optic article, such as an optical fiber or an optical preform, can include a core comprising a concentration of erbium, a concentration of fluorine and a concentration of ytterbium for sensitizing the erbium by absorbing pump light and transferring energy to the erbium. The erbium can provide light having a second wavelength different than the wavelength of the pump light. The article can also include a concentration of phosphorus. The fiber optic article can include a cladding disposed about the core, where the cladding has an index of refraction that is less than the index of refraction of the core, and a second cladding disposed about the first cladding, where the second cladding includes an index of refraction than is less than the index of refraction of the cladding. The fiber optic article can be elongate along a longitudinal axis and can include a longitudinally extending region for providing birefringence.

16 Claims, 7 Drawing Sheets

U.S. PATENT DOCUMENTS

| | | |
|---|---|---|
| 6,603,598 B1 | 8/2003 | Oliveti et al. |
| 6,625,363 B1 | 9/2003 | Carter et al. |
| 6,687,445 B1 | 2/2004 | Carter et al. |
| 6,690,868 B1 | 2/2004 | Anderson et al. |
| 6,700,697 B1 | 3/2004 | Nikolajsen et al. |
| 6,751,388 B1 | 6/2004 | Siegman |
| 6,779,364 B1 | 8/2004 | Tankala et al. |
| 6,950,586 B1 | 9/2005 | Po |
| 2002/0018630 A1 | 2/2002 | Richardson et al. |
| 2002/0030881 A1* | 3/2002 | Nilsson et al. ........... 359/341.1 |
| 2002/0114600 A1 | 8/2002 | Aiso et al. |
| 2002/0126974 A1 | 9/2002 | Bayart et al. |
| 2002/0172485 A1 | 11/2002 | Keaton et al. |
| 2002/0172486 A1 | 11/2002 | Fermann |
| 2003/0031444 A1 | 2/2003 | Croteau et al. |
| 2003/0137999 A1* | 7/2003 | Spiegelberg et al. ........... 372/6 |
| 2003/0152349 A1 | 8/2003 | Lauzon et al. |
| 2004/0069019 A1 | 4/2004 | Cartor et al. |
| 2004/0086245 A1 | 5/2004 | Farroni et al. |
| 2004/0105639 A1* | 6/2004 | Hasegawa ................... 385/125 |
| 2005/0008311 A1 | 1/2005 | Ferroni et al. |
| 2005/0008313 A1 | 1/2005 | Tankala et al. |
| 2005/0024716 A1 | 2/2005 | Nilsson et al. |
| 2005/0054510 A1 | 3/2005 | Ellison et al. |
| 2005/0118411 A1 | 6/2005 | Home et al. |
| 2005/0226580 A1 | 10/2005 | Samson et al. |

OTHER PUBLICATIONS

Fermann et al.; "Efficient Operation of an Yb-Sensitised Er Fibre Laser at 1.56um"; Electronics Letters, 1st Sep. 1986, vol. 24, No. 18; pp. 1135-1136.

Vienne et al.; "Fabrication and Characterization of Yb3+;Er3+Phosphosilicate Fibers for lasers"; J. Lightwave Technology, vol. 16, No. 11, Nov. 1990; pp. 1990-2001.

* cited by examiner

FIBER OPTIC ARTICLE INCLUDING FLUORINE

FIELD OF THE INVENTION

The present invention relates to fiber optic articles, such as for example, optical preforms and optical waveguides, such as optical fibers.

BACKGROUND

Fiber optic articles, such as for example, optical fiber preforms or optical fibers, can advantageously include one or more materials, such as, for example, one or more rare earths. The fiber can also include one or more other materials that can enhance the performance of the article, such as by reducing clustering or concentration quenching of the rare earths. Rare earths can be useful in lasers, amplifiers, superfluorescent sources, amplified spontaneous emission (ASE) sources and the like, as they can, in most instances, provide light having a selected wavelength responsive to the article receiving light (e.g., being "pumped" by "pump" light) having a different wavelength. Additionally or alternatively, one or more rare earths can be selected to absorb light.

Unfortunately, an optical article comprising one or more materials in the combinations or concentrations required to achieve a desired performance according to a first criterion can result in performance characteristic according to another criterion that is outside a desired range. For example, concentrations of materials desirable in a laser or amplifier to promote efficiency can result in an optical waveguide core having a higher numerical aperture than desired, as most materials known to be added to promote efficiency also raise the index of refraction of the host material (e.g., silica glass) that includes the materials.

It is an object of the present invention to address one or more of the deficiencies or disadvantages of the prior art.

SUMMARY OF THE INVENTION

In one aspect, the invention provides a fiber optic article having a core and an inner region surrounding the core, where the inner region has inner and outer perimeters spaced by a thickness $T_1$ therebetween and a first cross sectional area defined as all the area within the outer perimeter of the inner region. The fiber optic article also includes a cladding surrounding the inner region, where the cladding has inner and outer perimeters spaced by a thickness $T_2$ therebetween and the outer perimeter of the cladding has a geometric center. The inner region can have an index of refraction that is less the index of refraction of the core and the cladding can have an index of refraction that is less than the index of refraction of the inner region. $T_2$ can be greater than $T_1$, the outer perimeter of the inner region can be non-circular in shape and the geometric center of the cladding can lie within the first cross sectional area. The outer and inner perimeters of the inner region can define a cross sectional area $A_1$ therebetween and the outer and inner perimeters of the cladding can define a cross sectional area $A_2$ therebetween, and $A_2$ can be greater than $A_1$.

The cladding can consist essentially of fused silica. The fiber optic article can have a longitudinal axis, and the article can comprise at least one longitudinally extending region for providing birefringence. The optical article can comprise a second cladding surrounding the cladding, where the second cladding has an index of refraction that is less than the index of refraction of the cladding. The fiber optic article can be an optical fiber having an operating wavelength at which the fiber supports at least two modes each having an effective index of refraction that is greater the index of refraction of the inner region. The fiber optic article can include at least one rare earth such that responsive to the article being pumped by light having a first wavelength the at least one rare earth can provide light having a second wavelength that is different than the first wavelength, and the operating wavelength can comprise the second wavelength.

In another aspect, the invention can provide a fiber optic article that is elongate along a longitudinal axis and that comprises a core having an index of refraction; an inner region disposed about the core, where the inner region comprises a first index of refraction that is less than the index of refraction of the core and the inner region has an outer perimeter having an inwardly oriented section; a cladding disposed about the inner region, where the cladding comprising a second index of refraction that is less than the first index of refraction; and at least one longitudinally extending region for providing birefringence. The inwardly oriented region can face the longitudinally extending region. The inwardly oriented region can receive the longitudinally extending region.

The at least one longitudinally extending region can comprise a pair of longitudinally extending regions, and the inwardly oriented section can face one of the longitudinally extending regions and the outer perimeter can include a second inwardly oriented section facing the other of the longitudinally extending regions. The longitudinally extending regions can be diametrically opposed. The inner region can receive each of the longitudinally extending regions. In certain practices, the inner region can support inner region modes, and the longitudinally extending regions can attenuate the inner region modes. The longitudinally extending regions can comprise boron. The article can be an optical fiber having an operating wavelength and the core can be multimode at the operating wavelength.

In yet an additional aspect, the invention can provide a fiber optic article comprising a core; an inner region disposed about the core, where the inner region comprises an inner perimeter and an outer perimeter defining a cross sectional area $A_1$ therebetween of the inner region; a cladding disposed about the inner region, where the cladding comprises an inner perimeter and an outer perimeter, the perimeters defining a cross sectional area $A_2$ of the cladding; a second cladding disposed about the cladding; and a third cladding disposed about the second cladding. The index of refraction of the third cladding can be less than that of the second cladding, the index of refraction of the second cladding can be less than that of the cladding, the index of refraction of the cladding can be less than that of the inner region, and the index of refraction of the inner region can be less than that of the core. $A_2$ can be greater than $A_1$.

In an additional aspect, the invention can provide an optical fiber comprising a core comprising at least erbium and ytterbium for providing light having a first wavelength responsive to the fiber being pumped by light having a second wavelength that is different than the first wavelength; an inner region disposed about the core, where the inner region comprises a silica glass; a cladding disposed about the inner region, where the cladding consists essentially of silica; a second cladding disposed about the cladding, where the second cladding comprises silica glass and at least one index reducing material; a third cladding disposed about the second cladding, where the third cladding comprises a fluorinated polymer; and wherein the index of refraction of the third cladding is less than that of the second cladding, the index of refraction of the second cladding is less than that of the cladding, the index of refraction of the cladding is less than that of the inner region, and the index of refraction of the inner region is less than that of the core, and the core comprises a V-number at the first wavelength of greater than 2.405 and the core comprises a numerical aperture (NA) of less than 0.12. The V-number can be at least 3. The NA can be 0.09 or less. The concentration of erbium can include a concentration of erbium ions and the concentration of ytterbium can includes a concentration of ytterbium ions that is at least two times greater than the concentration of erbium ions.

In yet another aspect, the invention can provide a fiber optic article comprising a core comprising a rare earth; an inner region disposed about the core, where the inner region has an index of refraction that is less than that of the core and the inner region has an outer perimeter having a non-circular shape, where the non circular shape is other than an oval shape; a pump cladding disposed about the inner region, where the pump cladding is for receiving pump light for absorption by the rare earth and the pump cladding has an index of refraction that is less than that of the inner region; and a second cladding disposed about the pump cladding, the second cladding having an index of refraction that is less than that of the pump cladding. The core can comprise a concentration of erbium ions and a concentration of ytterbium ions. The concentration of ytterbium ions can be at least twice that of the concentration of erbium ions. The fiber optic article can have a longitudinal axis, and the article can comprise at least one longitudinally extending region for providing birefringence. The article can include a second cladding surrounding the cladding, where the second cladding has an index of refraction that is less than the index of refraction of the cladding. The article can be an optical fiber having an operating wavelength at which the fiber supports at least two modes each having an effective index of refraction that is greater than the index of refraction of the inner region. The operating wavelength can be greater than 500 nm. The operative wavelength can be greater than 900 nm. The fiber can include at least one rare earth such that responsive to the article being pumped by light having a first wavelength the at least one rare earth can provide light having a second wavelength that is different than the first wavelength, and the operating wavelength can comprise the second wavelength.

In yet another aspect, a glass fiber optic article according to the invention can comprise a core including a concentration of erbium, a concentration of fluorine and a concentration of ytterbium for sensitizing the erbium by absorbing pump light and non radiatively transferring energy to the erbium, where the erbium can provide light having a second wavelength different than the wavelength of the pump light; and a cladding disposed about the core, where the cladding having an index of refraction that is less than an index of refraction of the core. The core can comprise phosphorus. The concentration of erbium can include a concentration of erbium ions and the concentration of ytterbium can include a concentration of ytterbium ions that is at least 2 times greater, at least 6 time greater, at least 10 times greater or at least 20 times greater than the concentration of erbium ions. The fiber optic article can comprise a second cladding disposed about the cladding, where the second cladding has an index of refraction that is less than the index of refraction of the cladding. The fiber optic article can be an optical fiber having a V-number of at least 3, at least 4, or at least 6 at the second wavelength. The core can comprise at least 60% or at least 70% by weight of silica. The concentration of fluorine can be at least 1% by weight or at least 3% by weight. The concentration of fluorine can be from 0.1% to 3.5% by weight. The core can comprise a diameter of at least 12 microns or at least 15 microns. In various embodiments the core can have a numerical aperture that is less than 0.12, less than 0.09 or less than 0.06, as noted below.

In yet a further aspect, the invention provides an optical fiber including a core having a concentration of erbium, a concentration of fluorine, a concentration of phosphorus and a concentration of ytterbium for sensitizing the erbium by absorbing pump light and non radiatively transferring energy to the erbium. The erbium can provide light having a second wavelength different than the wavelength of the pump light. The optical fiber can include a cladding disposed about the core and having inner and outer perimeters spaced by a thickness therebetween, where the cladding has an index of refraction that is less than an index of refraction of the core. The core can have a V-number at the second wavelength of greater than 2.405 and a numerical aperture of less than 0.12 relative to the cladding. The thickness can be larger than the thickness of a region, if present, disposed between the cladding and the core.

The cladding can be a pump cladding for receiving the pump light and optical fiber can include a second cladding disposed about the cladding. The concentration of fluorine can be at least 1% by weight. The V-number can be at least 3. In one practice, the numerical aperture is no greater than 0.09 or is less than 0.09. The core can comprise a diameter of at least 12 microns or at least 15 microns.

A fiber optic article according to the invention, such as fiber optic article or optical fiber described herein, can include an inner region, such as may have been discussed, for example, in part in conjunction with certain aspects of the invention noted above. The inner region can comprise a maximum diameter and a minimum diameter, and in one practice of the invention the minimum diameter is not greater than 93% of the maximum diameter. The outer perimeter of the inner region can include at least one inwardly oriented (e.g., concave) section. The outer perimeter of the inner region can comprise at least one outwardly oriented region. The outer perimeter of the inner region can comprise at least one substantially straight section. At least a selected percentage of the length of the outer perimeter of the inner region can conform to a circle having a substantially constant radius. Such a circle can have its center within the outer perimeter of the core. The selected percentage can be, for example, at least 25%, 35%, 50%, or 75% of the length of the outer perimeter of the inner region. The selected percentage can represent a majority of the length (i.e., greater than 50% of the length). The outer perimeter of the inner region can have a non-oval shape.

A fiber optic article according to the invention, such as any fiber optic article or optical fiber described herein, can comprise a rare earth, as may have been discussed, for example, in part in conjunction with certain aspects of the invention noted above. For example, the core can comprise one or both of erbium and ytterbium.

A fiber optic article according to the invention, such as any fiber optic article or optical fiber described herein, can comprise a fiber having an operating wavelength, as may have been discussed, for example, in part in conjunction with certain aspects of the invention noted above. The core can be multimode at the operating wavelength. The operating wavelength can be greater than 500 nm. The operating wavelength can be greater than 900 nm. The operating wavelength can include the wavelength at which a rare earth provides light response to the fiber optic article receiving pump light.

A cladding of a fiber optic article according to the invention, such as, for example, any fiber optic articles or optical fibers described herein, can comprise a glass, as may have been discussed, for example, in part in conjunction with certain aspects of the invention noted above. A cladding can consist essentially of silica. In one practice of the invention, a second cladding can comprise a glass, which can be a silica glass doped with an index reducing material.

The core of a fiber optical article according to the invention, such as, for example, any fiber optic article or fiber described herein, can have a selected numerical aperture (NA), as may have been discussed, for example, in part in conjunction with aspects of the invention noted above. In one practice of the invention, the NA can be less than 0.12; in another practice of the invention, the NA of the core can be less than 0.09; and in yet another practice of the invention the NA of the core can be less than 0.06. The cladding can consist essentially of fused silica. Where the fiber has a longitudinal axis and includes a longitudinally extending stress inducing region for providing birefringence, the inner region and the longitudinally extending region can be the same region. Alternatively or additionally, the NA can be greater than 0.01, greater than 0.02 or greater than 0.03.

"Fiber optic article", as used herein, includes both a preform and an optical fiber. Preform can include a completed preform from which an complete optical fiber can be drawn as well as, for example, "partial" preforms that may form just part of the fiber (e.g., a core or a stress rod) and that usually have additional material added to them, or are usually incorporated into a larger preform, before draw. Specific examples may be discussed below in the Detailed Description in terms of an optical fiber or an optical fiber preform. One of ordinary skill in the art, cognizant of the disclosure herein, understands that such descriptions can apply generally to a fiber optic article.

Stating herein that one region of a fiber, such as a cladding, has or includes a lower refractive index or index of refraction than another region of a fiber, such as a core, means generally that the region will guide light if it were to be surrounded by the another region (e.g., the core guides light when clad by the cladding). One example is a optical fiber wherein the core and cladding are both formed from a similar material (e.g., silica glass), and one or both of the core and the cladding include material such that the index of refraction of the glass of the cladding is less than the index of refraction of the glass of the core. For example, the core can include germanium, which raises the index of refraction of the silica, and the cladding can consist essentially of silica glass. Also included in the definition of one region having a lower index of refraction than another region are regions that are designed to be microstructured, holey, photonic bandgap, as well as other designs that can allow for guiding of light. For example, in certain fiber designs, all or some materials of the regions can in fact have the same index of refraction but, for example, one of the regions can have been modified to have a lower effective index of refraction by including air holes to provide an lower average index of refraction or to provide a selected photonic bandgap, such that one of the regions can be disposed about the other of the regions and light can be guided. Such designs are within the scope of the present invention, and within the meaning of one region being stated herein to have a lower index of refraction than another of the regions, as provision is made for guiding of light.

Further advantages, novel features, and objects of the invention will become apparent from the following detailed description of non-limiting embodiments of the invention when considered in conjunction with the accompanying FIGURES. For purposes of clarity, not every component is labeled in every one of the following FIGURES, nor is every component of each embodiment of the invention shown where illustration is not considered necessary to allow those of ordinary skill in the art to understand the invention.

DETAILED DESCRIPTION

Figure 1:
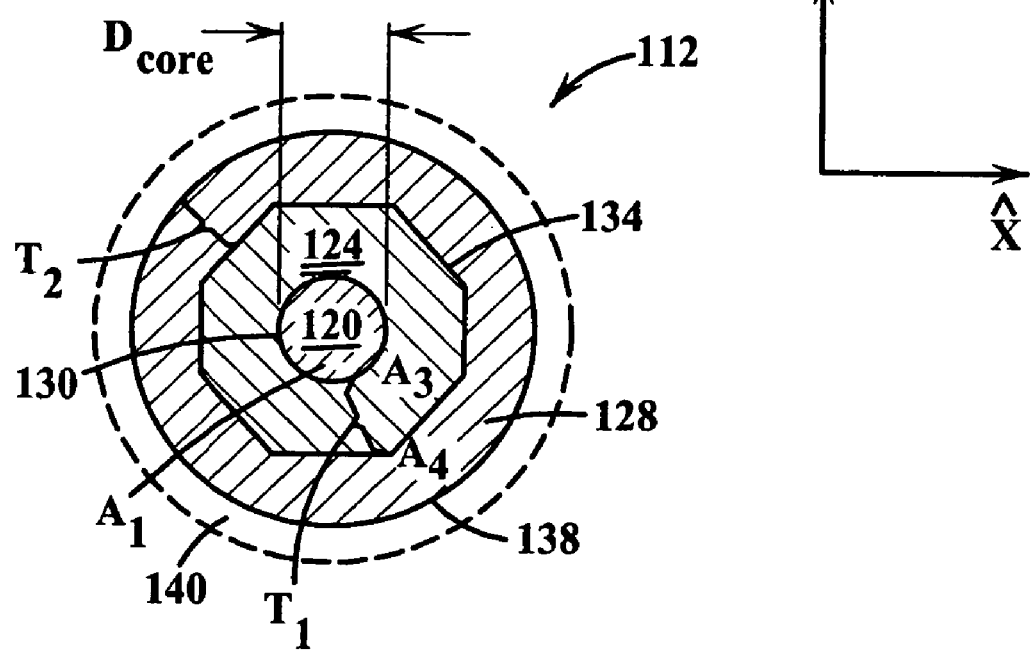
FIG. 1 schematically illustrates a cross section of one embodiment of a fiber optic article according to the present invention.

It is often desirable that a fiber optic article, such as a preform or an optical fiber, comprise a plurality of selected materials so as to provide the fiber optic article with certain capabilities. For example, U.S. Pat. No. 4,666,247, entitled "Multiconstituent Optical Fiber" and issued May 19, 1987 to MacChesney and Simpson, notes that an optical device, such as, for example, a glass (e.g., silica glass) based optical fiber, can beneficially include certain materials. These materials can include the "modifiers" noted in the '247 patent, which can include the 4f-type rare earths. Rare earths can be very useful in fiber lasers, amplifiers and other optical devices. A fiber can advantageously include, in addition to one of the modifiers, a second material, given the name in the '247 patent of a "homogenizer", that can aid in having the optical fiber include a higher concentration of the modifier or that can otherwise enhance the performance of an optical device that includes one or more modifiers. The '247 patent notes the homogenizers can include elements such as B, Al, Ga, In, P, As, and Sb.

Unfortunately, many of the more desirable modifiers and homogenizers raise the index of refraction of the host material (e.g., silica glass) that includes the homogenizers and/or modifiers. For example, as a result of including homogenizers and/or modifiers, a core can have a numerical aperture (NA) that is higher than desired in many circumstances. For example, in higher power amplifiers and lasers it can be desirable that a fiber have a fundamental mode having an increased mode field diameter (MFD). The increased MFD can reduce the power density in the fiber and hence delay the onset of nonlinear effects that can limit the ability of the fiber to handle higher powers. Such nonlinear effects can include stimulated Brillouin scattering (SBS) and stimulated Raman scattering (SRS). A fiber having a core having a lower NA and/or a larger diameter can provide a larger MFD that can delay the onset of SBS and SRS. Low NAs can be desirable for facilitating the attenuation of all higher order modes in amplifiers using a multimode fiber via the technique disclosed in U.S. Pat. No. 6,496,301, entitled "Helical Fiber Amplifier", issued Dec. 17, 2002, to Koplow, Kliner and Goldberg.

Fermann et al. in "Efficient Operation of an Yb-Sensitised Er Fibre Laser at 1.56 µm", Electronics Letters, Vol. 24, No. 18, pp. 1135–1136 (1988) teach that an optical fiber comprising erbium and ytterbium can be very useful, as the ytterbium can make pumping the erbium more practical, and the erbium can provide light at the useful wavelength of, for example, 1560 nm. In the Fermann et al. article, the core of the fiber includes phosphorus and aluminum in addition to erbium and ytterbium. In certain instances the NA of such a core can be higher than desired. For example, the core may not provide the desired larger MFD, especially where the cladding is formed from tube-derived silica glass, as is common in the modified chemical vapor deposition (MCVD) process for forming the preform from which an optical fiber is drawn.

U.S. Pat. No. 6,411,762, entitled "Optical Fiber with Irregularities at Cladding Boundary", issued Jun. 25, 2002 to Anthon, Emslie, and Maton teaches some techniques for lowering the NA of a single mode core that includes Yb/Er, such as by including an intermediate region between the core and a cladding, where the intermediate region has a raised index of refraction for lowering the NA of the single mode core. Multimode (as used herein meaning a core supporting two or more transverse modes) cores are not addressed.

Vienne et al., in the article entitled "Fabrication and Characterization of $Yb^{3+}:Er^{3+}$ Phosphosilicate Fiber for Lasers", Journal of Lightwave Technology, Vol. 16, No. 11, pp. 1990–2001 (1998), provides teaching related to erbium-ytterbium co-doped fibers.

FIG. 1 illustrates one embodiment of a fiber optic article 112 according to the invention. The fiber optical article 112 can include a core 120, a cladding 124 disposed about the core 120 and a second cladding 128 disposed about the cladding 124. The core 120 can have a substantially circular outer perimeter 130 that defines the cross-sectional area $A_1$ of the core 120. The cladding 124 includes an outer perimeter 134 that defines a cross-sectional area of all the area inside the bounds of the outer perimeter 134, which cross sectional area may include the cross sectional area of the core. The second cladding 128 can have an outer perimeter 138 that can also be substantially circular. The cladding 124 can contactingly surround, at least in part, the core 120 and the second cladding 128 can contactingly surround, at least in part, the cladding 124. The core 120 can have a diameter $D_{core}$.

The cladding 124 can include an inner perimeter (which in the embodiment of FIG. 1 is coextensive with the outer perimeter 130 of the core) that defines with the outer perimeter 134 of the cladding 124 the cross sectional area $A_3$ therebetween. The second cladding 128 can include an inner perimeter (which in the embodiment shown in FIG. 1 is coextensive with outer perimeter 134 of the cladding 124) that defines with the outer perimeter 138 of the second cladding 128 the cross sectional area $A_4$ therebetween. In one embodiment of the invention, the cross sectional area $A_3$ is larger than the cross sectional area $A_4$.

The inner and outer perimeters of the cladding 124 can be spaced by a thickness $T_1$, where the thickness is to be measured along a radius of the fiber 112. Similarly, the inner and outer perimeters of the second cladding 128 can be spaced by the thickness $T_2$. Where the either or both of the inner and outer perimeters of a region are non circular, the thickness can be different at different locations, and in such as case thickness as used herein refers to the maximum thickness of a region. Typically the thickness $T_1$ is greater than the thickness $T_2$. For clarity the thickness of various regions may not be shown in all the FIGURES herein; however, the concept as explained in conjunction with FIG. 1 apprises one of ordinary skill how it applied to regions of the other fiber optic articles described and shown herein.

A perimeter, such as the outer perimeter 134 of the cladding 124, can be defined by a set of points in the cross sectional plane, where each point has a particular x and y coordinate. The geometric center of a perimeter is the x, y point given by the average x coordinate of all the x coordinates of the outer perimeter and the average y coordinate of all the y coordinates of the outer perimeter The fiber optic article 112 can comprise one or more active materials for providing light having a first wavelength responsive to the fiber receiving (e.g., being "pumped by") light having a second wavelength (e.g., "pump" light) that is different than the first wavelength. The active material can include one or more rare earths, such as, for example, one or more of the Lanthanide elements of the periodic table (e.g., elements having atomic numbers from 57 to 71). Erbium, neodymium, thulium and ytterbium are all understood to be particularly useful in optical devices, such as, for example, fiber lasers, amplifiers, amplified spontaneous emission (ASE) or superfluorescent sources. "Providing light" includes light provided by stimulated emission or spontaneous emission as electrons decay from the higher energy levels to which they have been excited by the pump light and emit photons. Stimulated emission can occur responsive to provision of an external signal or seed beam, such as in certain types of optical amplifiers, as well as stimulated emission provided in certain types of lasers and other devices, where no external signal is necessary and light provided by spontaneous emission can initiate operation of the device. When erbium and ytterbium are both present in the proper arrangement (e.g., relative concentrations, placement in the fiber, etc.) the ytterbium can sensitize the erbium, meaning that the ytterbium absorbs pump light having a first wavelength and transfers energy to the ytterbium, such as by a non-radiative process, such that the erbium provides light. The light can have a second wavelength that is different than the first wavelength. Note that the term "light" as used herein generally means electromagnetic energy regardless of wavelength, and is not limited to light having a wavelength within the visible spectrum.

The core 120 and the cladding 124 can each guide light. Typically the cladding 124 guides light (e.g., pump light). In one embodiment of the invention, the cladding 124 can comprise an index of refraction $n_{clad}$ that is less than an index of refraction $n_{core}$ of the core 120, and the second cladding 128 can comprise an index of refraction $n_{clad2}$ that is less than the index of refraction $n_{clad}$ of the cladding.

The second cladding 128 can comprise a glass, such as, for example, a silica glass, and can include an index reducing material, such as, for example, fluorine or boron. The second cladding 128 can comprise a polymer, such as, for example, an acrylate polymer, which can be fluorinated. Note that a fiber according to the invention, such as the fiber 112, can also include another region 140, which can be a protective region that comprises an acrylate polymer applied to the fiber as it is drawn from a preform. The another region 140 can be disposed about the second cladding 128. Where the second cladding 128 comprises an acrylate polymer, such as a fluorinated polymer, the protective region 140 can often be omitted, as the second cladding 128 can also play a protective role. Note also that in some instances the second cladding 128 can be omitted. This can make pumping the fiber 112 more difficult and/or more expensive, but techniques are known in the art (e.g., end pumping the core using low divergence pump sources and dichroic and/or focusing optical elements).

As is known in the art, the cladding 124 can be adapted to receive the pump light to pump the one or more active materials comprised by the optical fiber 112. Typically the cladding is multimode at the pump wavelength. Also, the ratio of the cross sectional area defined by the outer perimeter 134 of the cladding 124 to the cross sectional area of the core 120 (i.e., the cross sectional area defined by the outer perimeter 130 of the core 120) is typically at least 10; at least 50; at least 100 or even at least 1000.

The outer perimeter 134 of the cladding 124 is typically non circular so as to scatter pump light received by the fiber to increase the absorption of the pump light by the active material, such as by disrupting skew rays. In FIG. 1 the outer perimeter 134 of the cladding 124 has an octagonal shape. Many other shapes are possible, as is known by one of ordinary skill in the art.

As noted in the aforementioned U.S. Pat. No. 6,411,762 entitled "Optical Fiber with Irregularities at Cladding Boundary", issued Jun. 25, 2002 to Anthon, Emslie, and Maton, a fiber can advantageously include erbium and ytterbium (e.g., erbium ions and ytterbium ions) and another material, such as phosphorus, that can enhance the efficiency of pumping the Yb/Er. The '762 patent is incorporated by reference herein to the extent that it is necessary to understand the present invention and does not conflict with the teachings herein.

Accordingly, a region of the fiber 112 (e.g., the core 120 of the fiber 112) can comprise a concentration of Yb, a concentration of Er, a concentration of a selected material that increases pumping efficiency and a concentration of a second selected material (e.g., fluorine) that reduces the index of refraction of the host material to which the aforementioned materials are added. The selected material may change (e.g., raise) the phonon energy of the host material for increasing the pumping efficiency. The host material can comprise a host glass, such as a silica glass that is, for example, at least 50%, at least 60%, at least 70% or at least 85% silica by weight. The core can comprise, consist of, or consist essentially of Yb (e.g., in the form of $Yb_2O_3$), Er (e.g., in the form of $Er_2O_3$), the selected material (e.g., phosphorus in the form of $P_2O_5$) and the second selected material (e.g., fluorine). Typically the selected material will raise the index of refraction of the host material. In certain circumstances, other materials, such as, for example, germanium can also be included in the same region of the fiber (e.g., the core) as the aforementioned materials (e.g., Yb, Er, P and F).

Addition of fluorine to the core of the fiber can help lower the NA of the core. As is understood by one of ordinary skill in the art, the NA of a fiber is related to the acceptance angle of the fiber by the formula NA=sin $\theta_{max}$, where $\theta_{max}$ is the maximum angle of incidence for a ray that will be guided by the fiber. For a fiber having a first region having a step refractive index profile relative to a second region (e.g., the core relative to the cladding or first cladding relative to a second cladding) the NA can be approximated according to the formula:

$NA=[(\text{refractive index of first region})^2-(\text{refractive index of second region})^2]^{1/2}$ The NA can also be measured experimentally, and measurements are preferably made to determine whether a fiber has an NA as specified herein, as the above formula is for an ideal step refractive index profile, whereas a measurement can be made on many different types of fibers (e.g., photonic bandgap fibers, which are included within the scope of the invention). Stating herein that one region of the fiber has a selected NA relative to another region of fiber means the NA obtained when the regions are adjacent such that any intervening region has little or no effect of the NA determination. Regions need not be adjacent for the forgoing to be a useful definition.

A region (e.g., the core) of a fiber according to the invention, such as the fiber 112 of FIG. 1 or any of the other fibers taught herein, may comprise a numerical aperture (NA) of less than 0.12; of no greater than 0.09; of no greater than 0.08; of no of no greater than 0.07; of no greater than 0.06; and of no greater than 0.05. In conjunction with any of the foregoing, it is noted that the NA can be at least 0.01, at least 0.02, or at least 0.03. The NA can also be from 0.05 to 0.11; from 0.06 to 0.11; from 0.07 to 0.11; or from 0.08 to 0.11. Other possibilities include a NA from 0.06 to 0.08; or from 0.05 to 0.09. The concentration of the second selected material, which reduces the index of refraction, may be selected at least in part to achieve the desired NA. Note that the NA of the core 120 can in certain circumstances actually be the NA of the core 120 relative to the cladding 124, and that in some embodiments of the invention the "pedestal" region of the aforementioned U.S. Pat. No. 6,411,762, disposed between the cladding 124 and the core 120 is not used to achieve a particular NA. The use of fluorine can help reduce the need for a "pedestal" or a pedestal to be of less consequence (e.g., not having as high index of refraction relative to a cladding).

The cladding 124 of the fiber 112, which may correspond to the second region in the above equation, can comprise fused silica. The cladding 124 can consist of or consist essentially of fused silica.

Typically the fiber (e.g., the core of the fiber) will comprise from 10% to 25% by weight of $P_2O_5$; from 0.5% to 5% by weight of $Yb_2O_3$; from 0% to 0.7% by weight of $Er_2O_3$; and from 0.1% to 3.5% by weight of F. In certain embodiments, a fiber optic article (e.g., the core of an optical fiber) can comprise at least 1%, at least 3%, or at least 5% by weight of fluorine. A glass host material, (e.g., $SiO_2$) typically makes up any remainder of material one or more of the foregoing. The core may be essentially free of aluminum. In one embodiment of the invention, the fiber (e.g., the core of the fiber) can comprise from 0 to $4.9\times10^{19}$ erbium atoms (e.g., $Er^{3+}$ ions) per cubic centimeter and from $3.3\times10^{19}$ to $3.4\times10^{20}$ ytterbium atoms (e.g., $Yb^{3+}$ ions) per cubic centimeter. Such a fiber can also include a concentration of phosphorus, which can be incorporated into a compound, such as, for example, $P_2O_5$. Typically, the concentration of ytterbium atoms or ions is higher than the concentration of erbium atoms or ions. The ratio of ytterbium ions to erbium ions can be, for example, at least 2:1, at least 6:1, at least 10:1; at least 12:1, at least 15:1; or at least 20:1. The concentration in weight percent of $Er_2O_3$ is typically higher than the concentration in weight percent of $Yb_2O_3$.

A preform from which a fiber according to the invention can be drawn can include one or both of phosphorus and fluorine added to the preform via Modified Chemical Vapor Deposition (MCVD) or other techniques known in the art, such as Plasma Assisted Deposition or Outside Vapor Deposition (OVD). The one or more rare earths, such as the erbium and ytterbium, can be included in the preform via Solution Doping, where an appropriate frit (e.g., a frit that includes a silica host material and possibly phosphorus and/or fluorine) is deposited via the MCVD or other technique. Solution doping is known in the art and is not further described herein.

Figure 2:
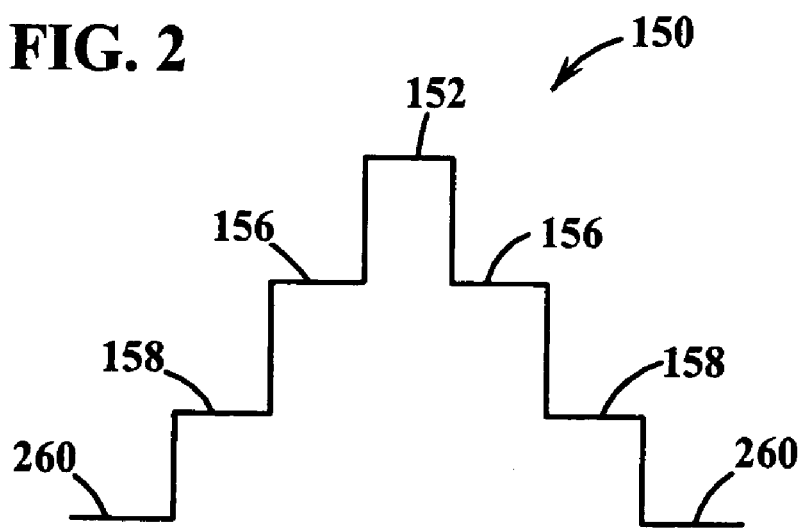
FIG. 2 schematically illustrates one example of a possible index of refraction profile taken across a selected diameter of the cross section of the fiber optic article of FIG. 1.

FIG. 2 schematically illustrates one example of a possible index of refraction profile 150 taken across a selected diameter of the cross section of the optical fiber 112 of FIG. 1. The index of refraction profile 150 includes a section 152 corresponding generally to the core 120 and hence representing $n_{core}$e; sections 156 corresponding generally to the cladding 124 and hence representing $n_{clad}$; and sections 158 corresponding generally to the second cladding 128 and hence representing $n_{clad2}$.

Figure 3A:
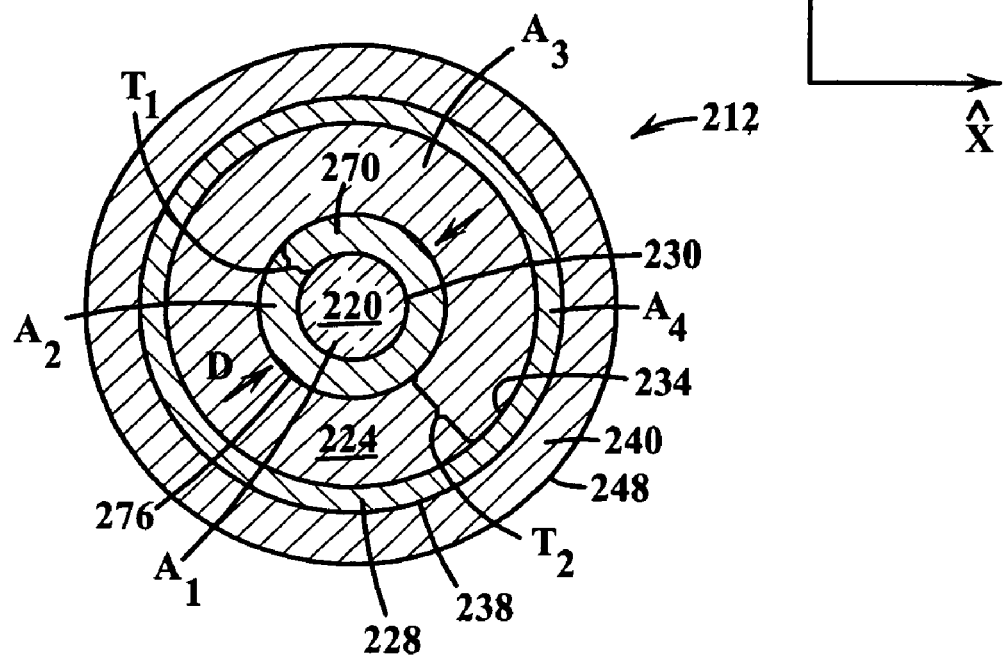
FIG. 3A schematically illustrates a cross section of a another embodiment of a fiber optic article according to the present invention.

FIG. 3A schematically illustrates a cross-section of a second embodiment of a fiber optic article according to the present invention.

The fiber optic article 212 of FIG. 3A includes an inner region 270 disposed about the core 220 and having an outer perimeter 276. The inner region 270 comprises an index of refraction $n_{regn}$, wherein $n_{regn}<n_{core}$; $n_{clad}<n_{regn}$; and $n_{clad2}<n_{clad}$. The article 212 can be a fiber and one or more of $n_{core}$, $n_{regn}$ and the diameter D of the inner region 270 can be selected such that the inner region 270 serves as a cladding for the core 220 and the fiber propagates at least one core mode at the first wavelength, where "core mode" means an LPxx mode wherein the effective index of refraction of the mode is higher than the effective index of refraction of the inner region 270. The calculation of an effective index of refraction for a mode is a well-known technique in the art. Calculations can be made using software, such as the FIBER_CAD OptiFiber Optical Fiber Design Software (version 1.5) available from Optiwave Corporation, 16 Concourse Gate, Suite 100, Nepean Ontario K2E 7S8, Canada, or according to other techniques using the mathematical models (or equivalents) used in the FIBER_CAD OptiFiber Software.

In one embodiment the core 220 is single moded at the operating wavelength of the fiber; in another embodiment the core 220 is multimode at an operating wavelength of the fiber. Specifying herein that a fiber is single mode or multimode refers to how the fiber will perform absent external influences (e.g., absent coiling to a radius to highly attenuate all higher modes, such as is taught in the aforementioned U.S. Pat. No. 6,496,301, entitled "Helical Fiber Amplifier", issued Dec. 17, 2002, to Koplow, Kliner and Goldberg. Note that in one embodiment of the fiber optic article 112 of FIG. 1, the fiber optic article does not include the inner region described in conjunction with FIG. 2.

The fiber optic article 212 can include a cladding 224 disposed about the inner region 270. A second cladding 228 can be disposed about the cladding 224. The fiber optic article 212 can also comprise another region 240 disposed about the second cladding 228 and having an outer perimeter 248. The region 240 can be a third cladding having an index of refraction $n_{clad3}$ that is less than $n_{clad2}$, which is in turn less than $n_{clad}$, which is in turn less than $n_{regn}$, which is less than $n_{core}$. It can be advantageous to include an additional cladding, especially where a fiber according to the invention will receive higher levels of pump power. Additional claddings can share the duty of confining the pump power. For example, in one embodiment of the invention, the cladding 224 can comprise undoped fused silica, or can consist essentially of or consist of fused silica. The cladding 224 can be derived, for example, from a commercially available silica tube that can be part of the preform from which the fiber is drawn. Such tubes are available from vendors such as Heraeus Arnersil. The second cladding 228 can comprise "down doped" fused silica, such as silica glass that is doped with fluorine, or can consist essentially of or consist of fluorine-doped silica. The second cladding 228 can be derived, for example, from a fluorinated silica glass tube that can be part of the preform from which the fiber is drawn. Fluorinated glass tubes are also understood to be available from Heraeus Amersil.

The region 240 can be a third cladding that comprises a polymer, such as, for example, a fluorinated polymer, which can be added as a coating to the fiber as the fiber is drawn from a preform, as is known in the art.

Note that the perimeter 234 of the cladding 224 of the fiber optic article 212 is shown in FIG. 3A as substantially circularly shaped. In general the perimeter 234 can be non-circularly shaped, and can be shaped as an octagon, as in FIG. 1.

The thicknesses $T_1$ of the inner region 270 and $T_2$ of the cladding 224 are shown. $T_2$ is typically greater than $T_1$. The outer perimeter 230 of the core 220 can define the cross sectional area $A_1$; the outer and inner perimeters of the inner region 270 can define the cross sectional area $A_2$ therebetween; the outer and inner perimeters of the cladding 224 can define the cross sectional area $A_3$ therebetween; and the outer and inner perimeters of the second cladding 228 can define the cross sectional area $A_4$ therebetween.

Figure 3B:
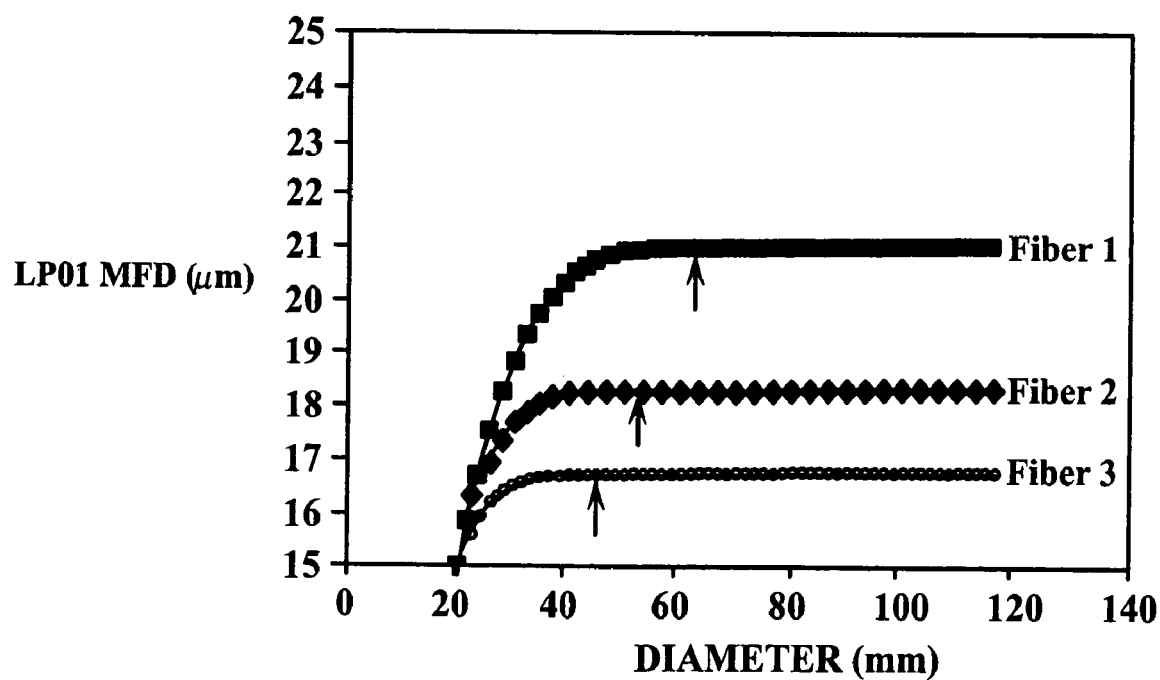
FIG. 3B is a plot of mode field diameter (MFD) versus a diameter of the inner region for selected fiber optic articles.

FIG. 3B illustrates a plot of the mode field diameter (MFD) of a selected LP mode (e.g., the $LP_{01}$ mode) versus a diameter of the inner region 270 (e.g., the diameter D of the outer perimeter 276 as shown in FIG. 2) for three optical fiber designs (fibers 1, 2 & 3), and a table summarizing certain features of the three fibers. Note that the change in the MFD tends to decrease as the diameter D of the outer perimeter 276 of the inner region increases. Several parameters are noted in the table of FIG. 3B. The "Core NA" and "Inner Region NA" listed in table are calculated relative to the index of refraction of the cladding 224, which for the calculations is assumed to consist essentially of silica. The "Effective core NA" listed in the table is the calculated NA of the core relative to the inner region based on the indices of refraction thereof, and the "Effective V Number" is V as calculated based on the Effective Core NA. The "Clad NA" is the NA of the clad relative to a second cladding, which is assumed to be a fluorinated polymer acrylate for the purposes of the calculations. The value noted in the table for "Inner Region Diameter" is a diameter (diameter $D_1$) of the inner region wherein, for an increase in the diameter of the inner region 276, the attendant increase in the MFD of a selected mode (e.g., the $LP_{01}$ mode) is no greater than a selected percentage of the MFD at the diameter $D_1$. In various embodiments of fiber optical articles according to the invention, the selected percentage can be, for example, 5%, 2.5%, 1%, or 0.5%. Preferably the selected percentage is no greater than 0.5%. The arrows in the plot correspond generally to the diameters in the table under the heading "Inner Region Diameter". For the diameters noted in the table, the percentage change in MFD is understood to be less than the preferred value of 0.5%. Note that the diameter listed under the heading "Inner Region Diameter" generally increases as the value listed under "Effective Core NA" decreases. The specific fibers of the table and plot of FIG. 3B are exemplary and represent more generally a design approach that can be applied to other fiber within the scope of the invention and not specifically described in FIG. 3B. For purposes of determined whether the MFD is varying with changes in a diameter of the inner region it is considered that actual measurements can be made of a number of fibers having different sized inner regions (the inner region should be proportionally scaled up in size if it has a non circular outer perimeter). The MFD diameter can be measured using a Spiricon Model LBA-300 Beam Analyzer or equivalent, where the $1/e^2$ power points are used to determine the MFD, as is common in the art.

Figure 4:
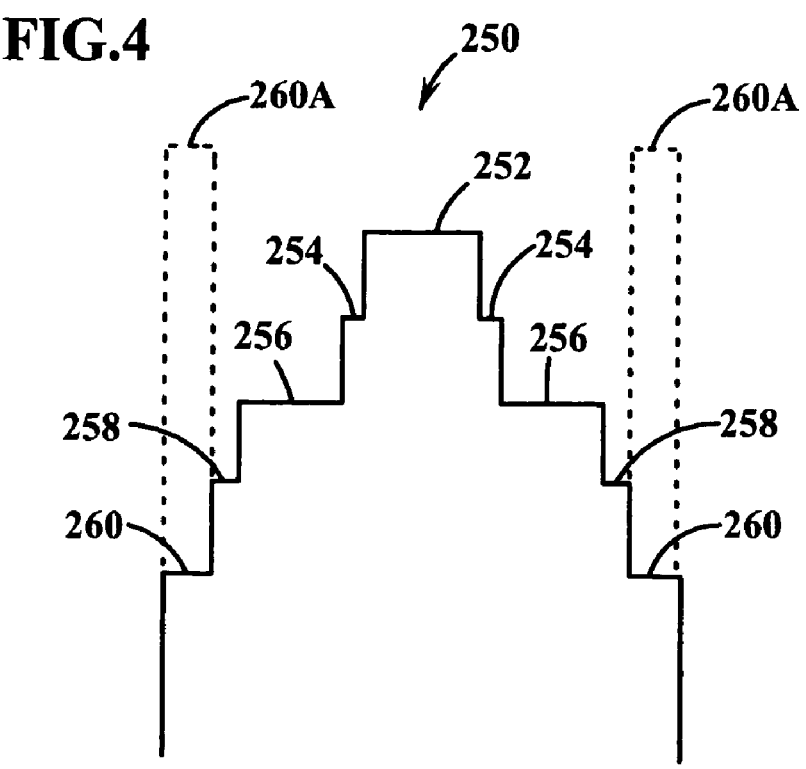
FIG. 4 schematically illustrates one example of a possible index of refraction profile taken across a selected diameter of the cross section of the fiber optic article of FIG. 3A.

FIG. 4 schematically illustrates one possible refractive index profile 250 for the fiber optic article 212, where the refractive index profile 250 is taken along a selected diameter of the cross section shown in FIG. 3A, such as a diameter along a selected one of the x and y axes. The refractive index profile 250 comprises a inner section 252, which can correspond to the core 220, sections 254, which can correspond the inner region 270, sections 256, which can correspond to the cladding 224, sections 258, which can correspond to the second cladding 228, and sections 260, which can correspond to the third cladding 240. The sections 260 can also be raised, as in indicated by reference numerals 260A, such as when the region 240 comprises an acrylate polymer having an increased index of refraction.

Figure 5:
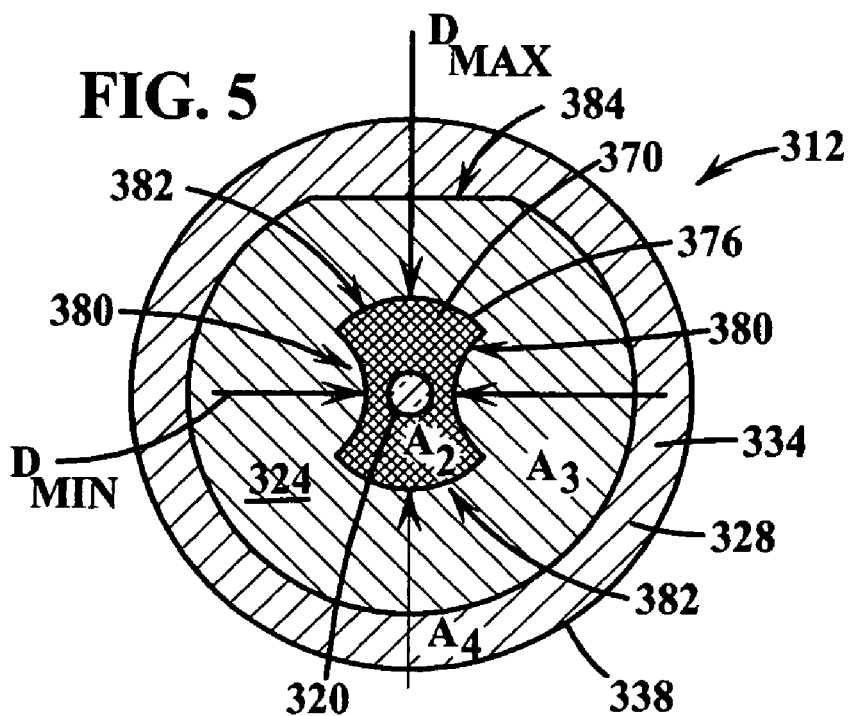
FIG. 5 schematically illustrates a cross section of yet another embodiment of a fiber optic article according to the present invention.

FIG. 5 illustrates another embodiment of a fiber optic article 312 according to the present invention. The fiber optic article 312 can comprise a core 320, an inner region 370 disposed about the core 320, a cladding 324 disposed about the inner region 370, and a second cladding 328 disposed about the cladding 324. The perimeter 376 of the inner region 370 can be non-circular, such as, for example, by including inwardly oriented lengths 380. The outer perimeter 376 of the inner region 370 can also include lengths, such as length 382, wherein the length can be defined by a substantially constant radius of curvature, such that the length 382 substantially conforms to a portion of a circle. The substantially constant radius of curvature can be about a center (from which the radius emanates) that is located within the outer perimeter 376 of the inner region 370, and preferably within the outer perimeter of the core 320, such as by being located substantially at the center of the core 320. It can be advantageous that the majority of the length of the outer perimeter 376 and/or the length of the outer perimeter 334 conform to a circle having its center located within the core 320.

When the fiber optic article 312 is a fiber, the non-circular perimeter 376 may help scatter any pump light that enters the inner region 370 to help ensure more efficient absorption of the pump light by rare earth comprised by the fiber 312.

The outer perimeter 334 of the cladding 324 can also be non-circular in shape, such as, for example, by having D-shape shown in FIG. 5. The outer perimeter 334 of the cladding 324 can include the substantially straight section 384, as indicated FIG. 5.

FIG. 5 illustrates the cross sectional areas $A_1$, $A_2$, $A_3$ and $A_4$, which can be defined as indicated in conjunction with the discussion of FIGS. 1 and 3A.

Figure 6:
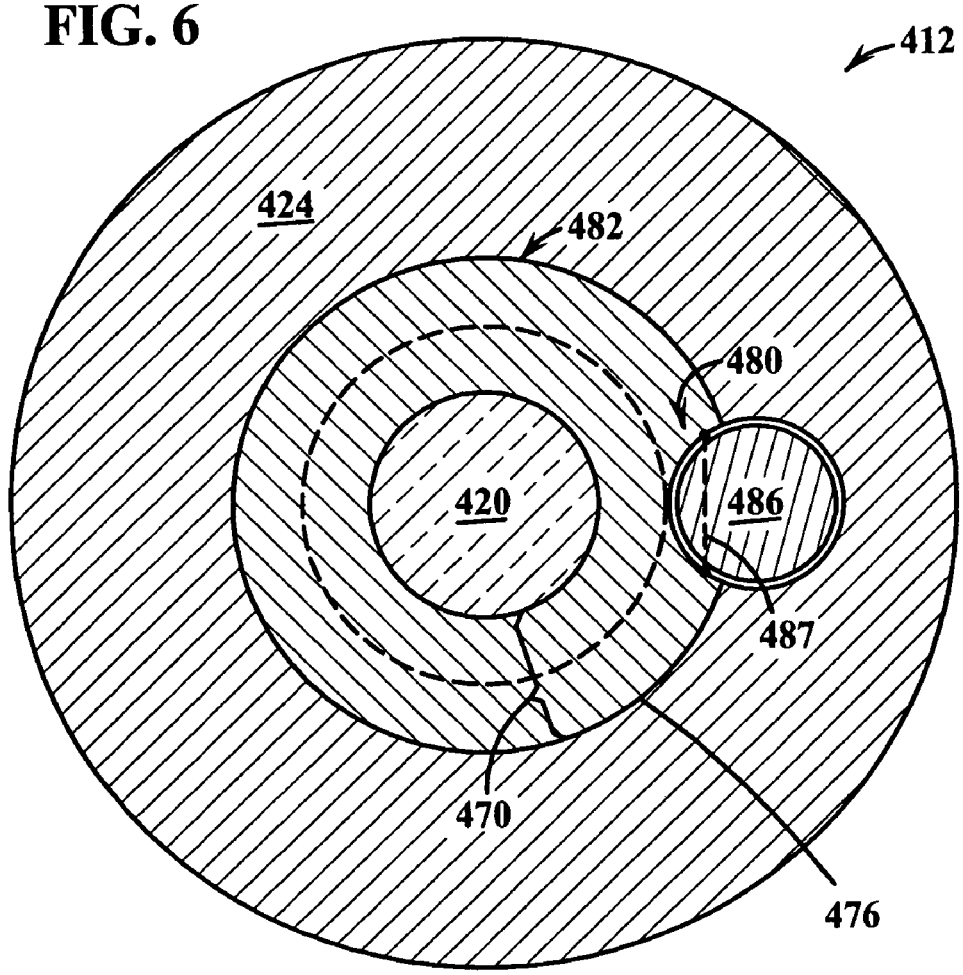
FIG. 6 schematically illustrates a cross section of a fiber optic article according to the present invention.

FIG. 6 can be useful in describing one technique for fabricating a fiber optic article 312 having an inner region 370 having a non-circular outer perimeter 376. Consider that reference numeral 412 represents at least part of an optical fiber preform from which at least part of a fiber 312 can be drawn. The preform can include a core portion 420; an inner region portion 470; and a cladding portion 424. The core portion 420 and inner region portion can be deposited, such as by the MCVD process, on the inside of a silica tube that is then collapsed, where the tube forms at least part of the cladding portion 424. A rod 486 can be inserted into a hole drilled into the preform, where the hole is drilled into at least part of the inner region portion 470. The rod 486 can comprise an index of refraction that is different than at least the index of refraction of the part of the inner region portion that is nearest to the rod 486. The outer perimeter 482 of the inner region portion 470 can include the inwardly oriented section 480. The rod 486 can comprise an index of refraction that is substantially the same as an index of refraction comprised by the cladding portion 424. In one embodiment of the invention the rod comprises an index of refraction that is less than an index of refraction comprised by the cladding portion 424.

Figure 7:
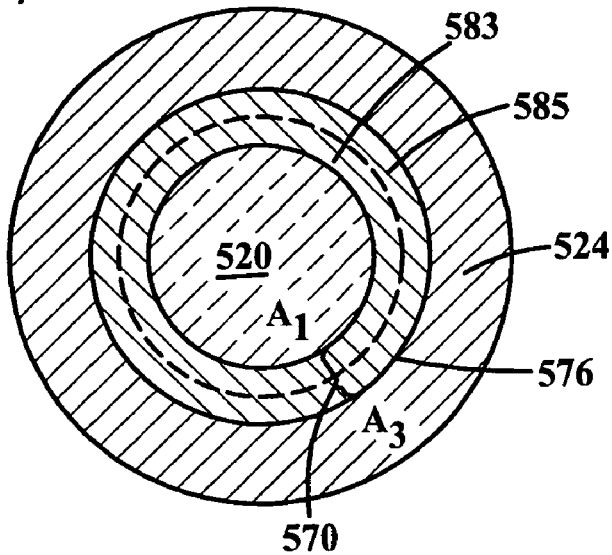
FIG. 7 schematically illustrates a cross section of an additional embodiment of a fiber optic article according to the present invention.

An inner region of an optical fiber according the invention can comprise a second inner region part 585 disposed about a first inner region part 583, as schematically illustrated in cross section in FIG. 7. For example, the core of an optical fiber of the invention, such as the core 520, can comprise phosphorus, erbium and ytterbium, where the phosphorus can reduce backtransfer of energy from the erbium to the ytterbium and thus increase the efficiency of the optical fiber. Typically, however, the NA of the core would be much higher than is desired (relative to pure fused silica) due to one or more of the foregoing materials raising the index of refraction of a host glass material, such as silica glass. The inner region 570 comprises an index of refraction that is greater than an index of refraction comprised by the cladding 524 so as to lower the NA of the core 520. Although in theory the inner region could be omitted and the index of refraction of the whole cladding 524 could be raised to reduce the NA of the core 520, this is difficult in practice due to the amount of material than must be deposited when processes such as MCVD are used to fabricate all or part of a preform from which the optical fiber is to be drawn.

The inner region 570 can include an inner part 583 that may be different from an outer part 585 of the inner region 570. In some embodiments the difference can be described in terms of the constitution of each of the parts. For example one of the parts can include a material (e.g., a dopant, such as germanium) not included in the other of the parts or, more generally, can include a concentration of a material that is different than the concentration comprised by the other of the parts. In other embodiments the difference can be described in terms of a characteristic of the part, such as hardness or glass transition temperature.

For example, in one embodiment of the invention the outer part 585 of the inner region 570 can comprise a harder material (e.g., a harder glass) than the inner part 583 of the inner region 570, which will typically also comprise a glass.

Such an arrangement can help maintain the shape of the outer perimeter 576 of the inner region 570 during drawing of the fiber from a preform. The inner part 583 can comprise, consist of, or consist essentially of a host glass, such as, for example, a silica glass, and phosphorus (P), and the outer part 585 can comprise, consist of, or consist essentially of a host glass, such as, for example, a silica glass, and P and another material, such as for, example, germanium (Ge). Thus one of the parts of the inner region 570 can comprise a selected material of which the other part is essentially free, or one of the parts of the inner region 570 can comprise a substantially different concentration (i.e., not a difference attributable to process variations where the intent is to have the concentrations be the same) of the selected material than the other of the parts.

Both of the foregoing can be applicable. For example, the inner part 583 can include a first selected material (e.g., P in the form of $P_2O_5$) that is also included in the outer part 585 but in a substantially different concentration (e.g., the inner part 583 can comprise 10–20 weight % of $P_2O_5$ and the outer part can comprise 0–10 weight % of $P_2O_5$ and the outer part 585 can comprise a second selected material (e.g., 0–10 weight % of $GeO_2$) of which the inner part 583 is substantially free. Preferably, the inner part 583 of the inner region 570 comprises an index of refraction that is substantially the same as an index of refraction comprised by the outer part 585 of the inner region 570. This can be achieved by proper selection of the concentrations of the material in each of the inner and outer parts of the inner region 570.

The inner region 570 can have an index of refraction than is substantially the same throughout the inner region 570, such that the inner region is considered by one of ordinary skill in the art to comprise a "step" in the index of refraction profile of the fiber.

The inner part 583 can be closer in composition to the core 520 than the outer part 585, which is closer in composition to the cladding 524 than the inner part 583. The inner part 583 can comprise a higher internal stress than the outer part 585. Lower internal stress in the outer part 585 can facilitate drilling of the hole that receives rod 486 shown in FIG. 6.

The inner region (e.g., the inner region 370 of FIG. 5) can be non-circular and can have a maximum diameter and a minimum diameter. The minimum diameter can be no greater than 50%, no greater than 60%, no greater than 70%, no greater than 80%, no greater than 90%, or no greater than 93% of the maximum diameter. In one practice of the invention the minimum diameter is from 80% to 95% of the maximum diameter. The outer perimeter of an inner region can be non-circular and non-oval.

The inner region 570 (e.g., the outer part 585 of the inner region 570) of an optical fiber according to the present invention can include an attenuating material for selectively attenuating, relative to core modes, modes having power (e.g., 25% or greater of the total power of the mode) outside of the cross section of the core 520. The attenuating material can be a wavelength selective material for selectively attenuating a first wavelength relative to the pump wavelength (e.g., cobalt, terbium or the like, which can be appropriate when the fiber includes erbium and ytterbium). Selectively attenuating means that the attenuation of light having the first wavelength is higher than the attenuation provided by the material for light having the pump wavelength. Preferably the attenuation is significantly higher. The outer part 585 can include the wavelength selective material and the inner part 583 of the inner region 570 can be substantially or essentially free of the wavelength selective material. U.S. Pat. No. 6,278,816, entitled "Noise Reduction Technique for Cladding Pumped Optical Amplifiers", issued Aug. 21, 2001, which is a continuation-in-part of the aforementioned '762 patent, includes some teaching related to materials for providing wavelength selective attenuation.

In another embodiment, the inner region 570 of an optical fiber according to the present invention is not adapted to selectively attenuate inner region modes relative to a core mode or modes. For example, in one embodiment the outer region 585 does not comprise an attenuating material or a wavelength selective attenuating material for selectively attenuating inner region modes and/or light having a first wavelength (e.g. the wavelength at which an active material provides light) relative to light having the pump wavelength.

The areas $A_1$, $A_2$, $A_3$ and $A_4$ (applicable when a second cladding is present) are not shown in FIGS. 6 and 7, but can be defined as indicated in conjunction with the discussion of FIGS. 1 and 3A.

The range of wavelengths at which fiber lasers and amplifiers can efficiently operate can be limited compared to other types of lasers and amplifiers. It can be desirable to convert light from a fiber device to another more useful wavelength.

Light is an electromagnetic wave in which the electric field can oscillate along a direction that is perpendicular to the direction in which the light propagates. For example, if the electric field vibrates along the horizontal axis, the light is said to be horizontally polarized; if the light vibrates along the vertical axis, the light is said to be vertically polarized. Optical fiber typically propagates light in two orthogonal polarizations (i.e., both vertical and horizontal) for each mode propagated by the fiber. The light can couple back and forth from one polarization to the other as the light propagates along the fiber, such that the polarization of the light emanating from the fiber is a mixture of both vertical and horizontal polarizations and is thus not controlled. Proper control of the polarization, however, can be important in many applications.

In one practice of the invention, a fiber can include a selected birefringence, such as, for example, a selected birefringence at the wavelength of operation of the fiber. Birefringence can help to provide an optical fiber with polarization maintaining or polarizing properties, which can be useful in controlling the polarization of the light propagated by the fiber. For example, coupling between orthogonal linear polarizations is inevitable in a practical fiber. Providing a fiber with sufficient birefringence, such that the light in one of the polarizations has a different phase velocity and/or wavelength than light in the other of the polarizations, can reduce any constructive superposition of light undesirably coupled into one linear polarization from the orthogonal (and desired) polarization at various locations along the length of a fiber.

Figure 8:
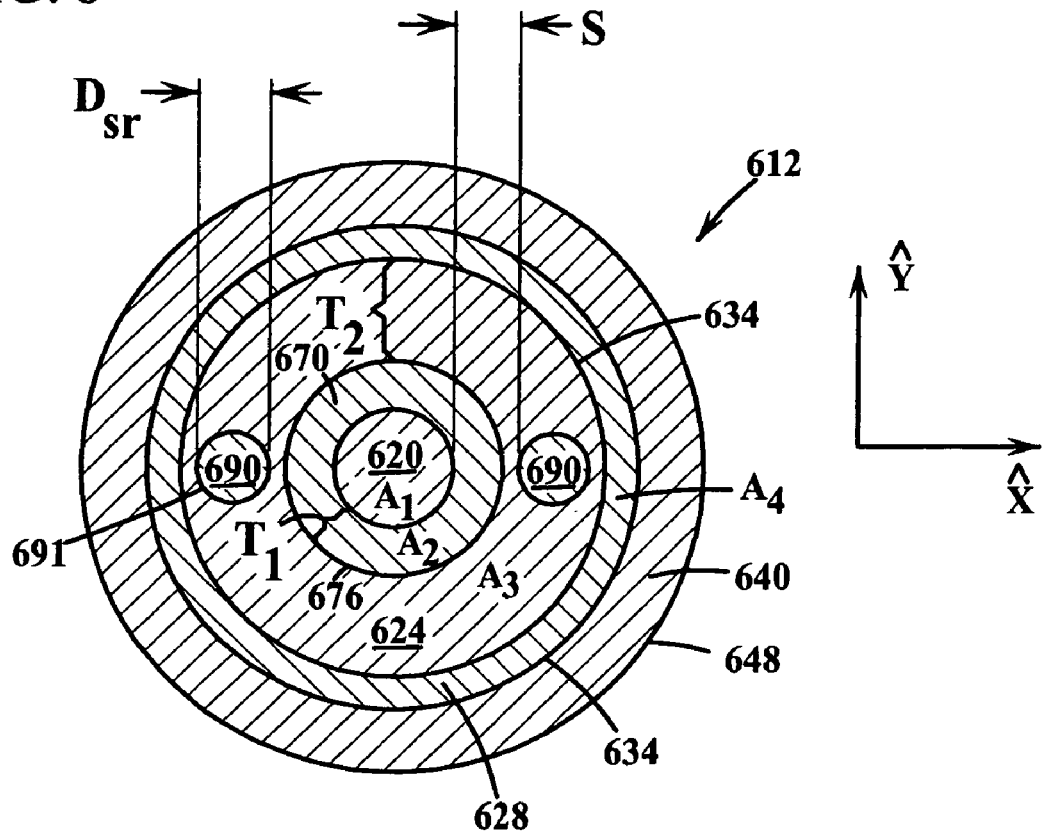
FIG. 8 schematically illustrates a cross section of yet a further embodiment of an optical fiber according to the present invention.

FIG. 8 illustrates an additional embodiment wherein a fiber optic article, such as the fiber optic article 112 of FIG. 1, includes longitudinally extending regions for providing birefringence, such as by providing a sufficient refractive index change or by inducing stress in all or part of a selected region of the optical fiber. The fiber optic article 612 includes a core 620 and can further include an inner region 670 disposed about the core 620. The fiber optic article 612 includes a cladding 624 disposed about the core 620 and a second cladding 628 disposed about the cladding 624. The fiber optic article 612 includes a pair of longitudinally extending regions 690, where the longitudinal axis is the axis along which the fiber is elongate. FIG. 8 illustrates a "panda" style fiber where each of the regions 690 has a substantially circular outer perimeter 691. Other designs, such as the "bowtie" design, wherein the stress inducing regions have non-circular outer perimeters, are also within the scope of the invention. The longitudinally extending regions 690 can each have a thermal coefficient of expansion (TCE) that is different than the TCE of at least part of a region (e.g., the cladding 624) of the fiber 612 that is disposed about the longitudinally extending regions 690. Because the TCEs of the regions 690 and the cladding 624 are different, a stress is induced in all or part of a region or regions of the fiber, such as, for example, the core 620, when the fiber cools after being drawn, such as when being drawn from a heated preform. The stress can introduce a selected birefringence (i.e., different refractive indices for the orthogonal linear polarizations) due to the stress-optic effect. Birefringence can be introduced to the fiber 612 in other ways, in addition to or alternatively to the use of the longitudinally extending stress inducing regions 690. For example, the core 620 can have an elliptical cross section, as is known in the art. Also, the longitudinal region can provide a selected change in effective refractive index along a selected axis of the fiber in addition or alternative to inducing stress in the fiber optic article. The inner region 670 can be omitted. The core of the fiber optic article can include materials and concentrations thereof noted in conjunction with the discussion of FIG. 1.

The birefringence is a function at least of the diameter $D_{sr}$ of the regions 690, the spacing S between the longitudinally extending regions 690 and the core 620, and the difference between the TCE of each of the longitudinally extending regions 690 and the TCE of the regions of the fiber disposed about the longitudinally extending regions 690 such as, for example, the TCE of the inner cladding 624. Increasing the diameter $D_{sr}$, decreasing the spacing S between the longitudinally extending regions 690 and the core 620, and increasing the difference between the TCEs of the longitudinally extending regions 690 and the TCE of the inner cladding 624 all increase the birefringence. As is understood by one of ordinary skill in the art, the longitudinally extending regions typically comprise one or both of boron and phosphorous, typically in the form of one or more of $B_2O_3$, $P_2O_5$, or $BPO_4$, although other dopants can be used. For example, germanium (e.g., as $GeO_2$) aluminum (e.g., as $Al_2O_3$) and titanium or fluorine can also be used to help provide a desired TCE. The foregoing materials can be used alone or in combination. For example, increasing the amount of boron and/or phosphorus comprised by the longitudinally extending regions 690 typically increases the birefringence of the optical fiber.

Because phosphorus and boron have opposite effects on the index of refraction of a host glass, such as a host glass that comprises silica, the longitudinally extending regions 690 can comprise an index of refraction that can be selected substantially independently of the TCE of the stress inducing region.

Preferably, the longitudinally extending regions 690 have an index of refraction that is lower than the index of refraction of the inner cladding 624 such that the longitudinally extending regions 690 do not guide light. Suitable index differences between one or both of the longitudinally extending regions 690 and the inner cladding 624 can range from 0.005 to 0.015. One typical index difference found to be useful is out 0.01.

Longitudinally extending regions for inducing stress are well known in the art and the proper composition for achieving the particular TCE and hence inducing a particular stress in the fiber are also well known and only briefly discussed here. See, for example, the thesis of Bent Edvold entitled "Polarization Maintaining Fibers", Electromagnetics Institute, Technical University of Denmark, EF-402, April, 1994. Tankala et al. have described in detail the theoretical, geometrical and manufacturing considerations for providing a fiber with birefringence, particularly with reference to polarization maintaining double clad fibers (see for example K. Tankala, A. Carter, D. P. Machewirth, J. Farroni, J. Abramczyk and U. H. Manyam, SPIE proc v. 4974, p 220, 2003, incorporated herein by reference). The foregoing are incorporated by reference to the extent necessary to understand the present invention and to the extent that they do not conflict with the teachings herein. See also patents relating to polarization maintaining fibers, such as, for example, patents from Corning Glass Works of Corning, N.Y., which is well known for developing fibers designed to have selected birefringence and hence be polarization maintaining or polarizing.

More particularly, see U.S. Pat. No. 4,395,270, entitled "Method of Fabricating a Polarization Retaining Single-Mode Optical Waveguide", filed Apr. 13, 1981 and issued Jul. 26, 1983 to Blankenship and Keck. See also U.S. Pat. No. 4,478,489, entitled "Polarization Retaining Single-Mode Optical Waveguide", filed Mar. 28, 1983 and issued Oct. 23, 1984 to Blankenship and Keck, as well as U.S. Pat. No. 4,561,871, entitled "Method of Making Polarization Preserving Optical Fiber", filed Dec. 27, 1983 and issued Dec. 31, 1985 to Berkey. In addition, see U.S. Pat. No. 5,152,818, entitled "Method of Making Polarization Retaining Fiber", filed Nov. 9, 1990 and issued Oct. 6, 1992 to Berkey, Bhagavatula, Hawk and Tarcza. See in addition U.S. Pat. No. 4,896,942, entitled "Polarization-Maintaining Optical Fiber", filed Feb. 3, 1989 and issued Jan. 30, 1990 to Onstott, Messerly, Mikkelson and Donalds. Publications include G.B. Patent Application 2,012,983 A, entitled "Optical Waveguides Having Non-Uniform Outer Jackets", published Aug. 1, 1979 in the names of Kaminow, Pleibel, Ramaswamy and Stolen; Hosaka et al., Electronics Letters, 17, 191 (1981); Hosaka et al., Electronics Letters, 17, 631 (1981); and D. Kliner et al., Optics Letters 26, 184 (2001).

As noted above, polarization maintaining fibers typically use birefringence to reduce the effect (e.g., constructive superposition) of any coupling between orthogonal linear polarizations. Typically, this means that a PM fiber is designed to have as high a birefringence as possible. Fibers having increased birefringence are typically one or more of more expensive and more difficult to manufacture than fibers having lower birefringence. However, coupling between polarizations can be reduced such that increased birefringence is supposedly not as necessary. See published U.S. patent application US 2002/0172486 A1, which indicates that the diameter of an optical fiber can be selected to reduce coupling between polarizations.

A polarizing fiber can also use birefringence. For example, in one approach, birefringence is introduced into both the core and the cladding, with the core having a higher birefringence than the cladding, and such that one of the polarizations has a larger mode field diameter and is sufficiently more susceptible to bend loss. In another approach, the index of the core and cladding are equal for one of the polarizations, such that the one polarization is not guided. In another approach, the birefringence of the core and cladding are equal, but the mode for one of the polarizations is "leaky" because it has a small component along the direction of the other polarization which sees loss, as the fiber is designed such that the effective index for the one polarization is lower than the index of refraction for the other polarization.

In yet a further approach, a polarizing fiber can include absorptive stress inducing regions. In an additional approach, a "W" shaped refractive index profile allows one of the polarizations to "tunnel" through the "well" of the "W" and sees the higher index of the cladding outside the well. Other approaches include providing a metal film on one side or on opposing sides of the optical fiber (to selectively attenuate one polarization) or providing a metal cladding over the fiber. Typically, a polarizing fiber includes a window of wavelengths, such as, for example a window of 20 nm or 100 nm, wherein one polarization has high loss and the other polarization has lower, and hopefully, acceptable, loss for the application in which the polarizing fiber is to be used.

Various approaches are described in the following publications and patents that are understood to address polarizing fibers: J. R. Simson et al., Journal of Lightwave Technology, 1, 370 (1983); K. Okamato, Applied Optics 23, 2638 (1984); Kin Seng Chang, Journal of Lightwave Technology, 7, 436 (1989); Michael J. Messerly et al., Journal of Lightwave Technology, 9, 817 (1991); Frank F. Ruhl and Danny Wong, Optics Letters, Vol. 14, 648 (1989); M. P. Varnham et al., Electronics Letters, 19, 246 (1983); M. P. Varnham et al., Optics Letters 9, 306 (1984); K. Okamoto, Applied Optics 23, 2638 (1984); K. Okamoto, Journal of Lightwave Technology 3, 758 (1985); W. Eickhoff, Optics Letters 7, 629 (1982); A. W. Snyder and F. Ruhl, Journal of the Optical Society of America, 73, 1165 (1983); R. H. Stolen et al., Electronics Letters, 24, 524 (1988); K. Tajima et al., Journal of Lightwave Technology, 7, 1499 (1982); K. S. Chiang, Journal of Lightwave Technology, 7, 436 (1989); W. Eickhoff, Electronics Letters, 16, 762 (1980); P. Kornreich et al., Proceedings of the SPIE 2749, 11 (1996); T. Hosaka et al., Optics Letters 8, 124 (1983); T. Hosaka et al., Journal of Quantum Electronics, 18, 1569 (1982); R. A. Bergh et al., Optics Letters 5, 479 (1980).

See also the following U.S. Patents: U.S. Pat. No. 4,515,436, entitled "Single-Mode Single Polarization Optical Fiber", filed Feb. 4, 1983 and issued May 7, 1985 to Howard, Pleibel, Simson, and Stolen; and U.S. Pat. No. 5,056,888, entitled "Single-Mode, Single-Polarization Optical Fiber", filed Jul. 17, 1989 and issued Oct. 15, 1991 to Messerly, Onstott and Mikkelson.

In some embodiments, a fiber according to the invention can be polarizing at a selected wavelength (e.g., the first wavelength). In certain embodiments, a fiber according to the invention can be polarization maintaining at a selected wavelength of operation (e.g., the first wavelength).

Figure 9:
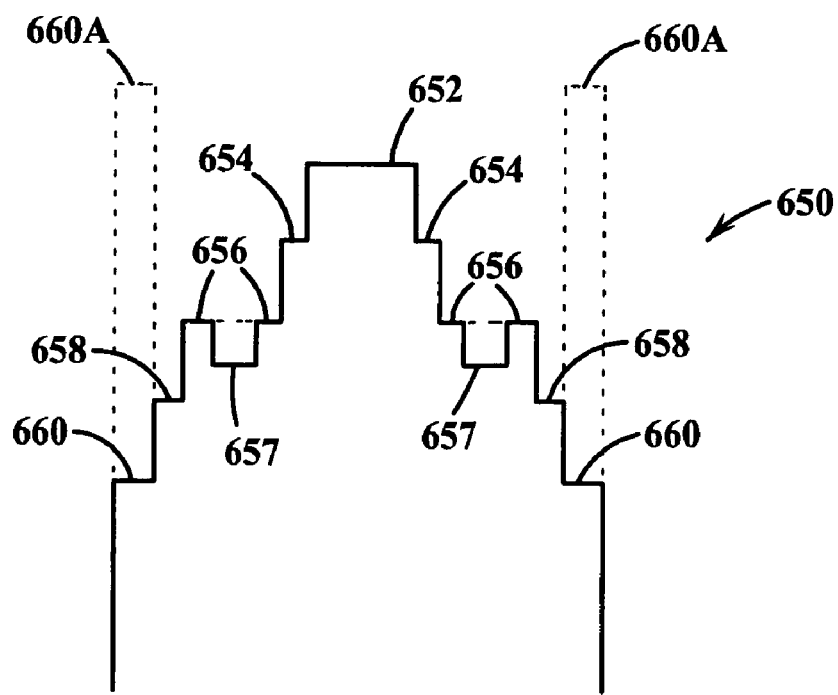
FIG. 9 schematically illustrates one example of a possible index of refraction profile taken across a selected diameter of the cross section of the optical fiber of FIG. 8.

FIG. 9 schematically illustrates one possible refractive index profile 650 for the fiber optic article 612, where the refractive index profile 650 is taken along a selected diameter of the cross section shown in FIG. 8, such as along the x axis. The refractive index profile 650 comprises a inner section 652, which can represent the core 620, sections 654, which can represent the inner region 670, sections 656, which can represent the cladding 624, sections 657, which can represent the longitudinally extending regions 690; sections 658, which can represent the second cladding 628, and sections 660, which can represent the third cladding 640. The sections 660 can also be raised, as in indicated by reference numerals 660A, such as when the region 640 comprises an acrylate polymer having an increased index of refraction.

Figure 10:
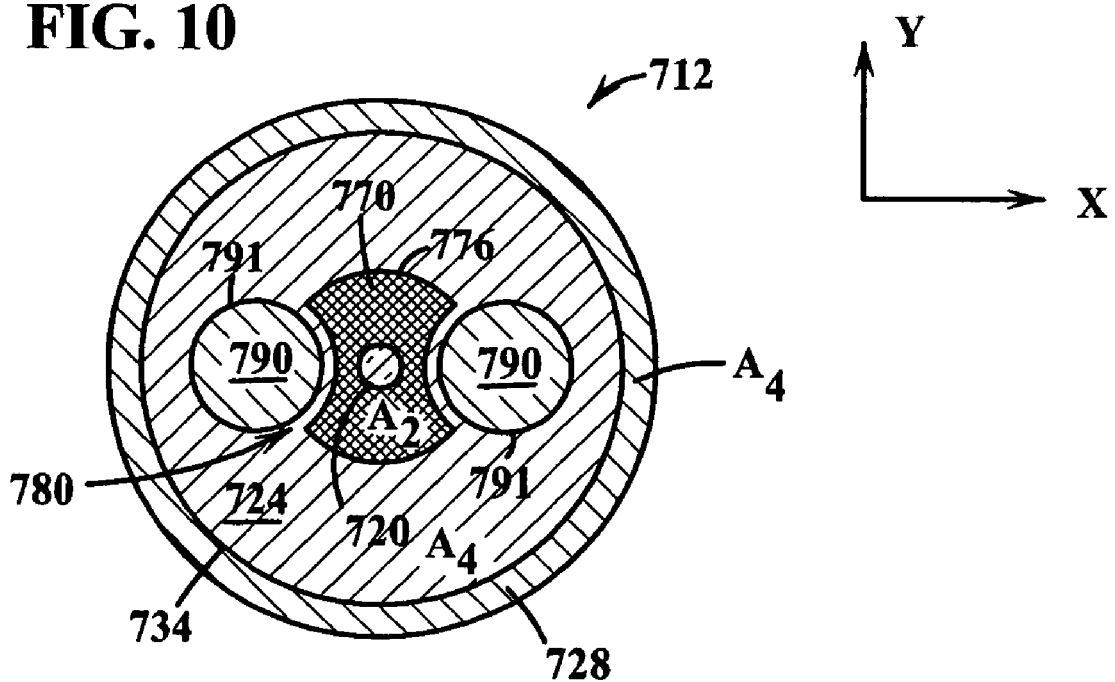
FIG. 10 schematically illustrates a cross section of another embodiment of an optical fiber according to the present invention.

FIG. 10 illustrates another embodiment of a fiber optic article according to the present invention. The fiber optic article 712 comprises a core 720, an inner region 770 disposed about the core 720, a cladding 724 disposed about the inner region, and a second cladding 728 disposed about the first cladding 724. The core 720, inner region 770, cladding 724 and second cladding 728 can each comprise, respectively, indices of refraction $n_{core}$, $n_{regn}$, $n_{clad}$ and $n_{clad2}$, where $n_{regn}$ is less than $n_{core}$; $n_{clad}$ is less than $n_{regn}$; and $n_{clad2}$ is less than $n_{clad}$.

The optical fiber 712 can also include longitudinally extending regions 790 for providing birefringence. The longitudinally extending regions can each have a TCE that is different than the TCE of at least part of the region (e.g., the cladding 724) that surrounds, at least in part, the longitudinally extending regions 790. The longitudinally extending regions each induce stress in part or all of a selected region(s) of the fiber for helping provide the fiber with a selected birefringence. Note that the inner region 770 includes an outer perimeter 776, which can be non-circular. As shown in FIG. 10, the outer perimeter 776 can include inwardly oriented sections or lengths 780 that each face a different one of the longitudinally extending regions 790. For example the outer perimeter 776 of the inner region 770 can include a concave section that faces a convex length (e.g., a length of a circular perimeter) of the outer perimeter 791 of a longitudinally extending region 790.

The inner region 770 can receive one or both of the longitudinally extending regions 790. With brief reference to FIG. 6, the fiber optic article 712 can be drawn from a preform 412, where the rods 486 that are inserted into the holes of the preform 412 are "stress rods" that form the longitudinally extending regions 790 upon drawing the fiber 712 from the preform 412.

The inner region 770 can receive one or both of the longitudinally extending regions 790, where receive, as used herein, means that a straight line intersecting the outer perimeter 776 of the inner region 770 also intersects the longitudinally extending region 790. As an example, see FIG. 6, where the straight line 487, which intersects the outer perimeter 476, also intersects the rod 486, and hence the inner region 470 can be said to receive the rod 486.

Figure 11:
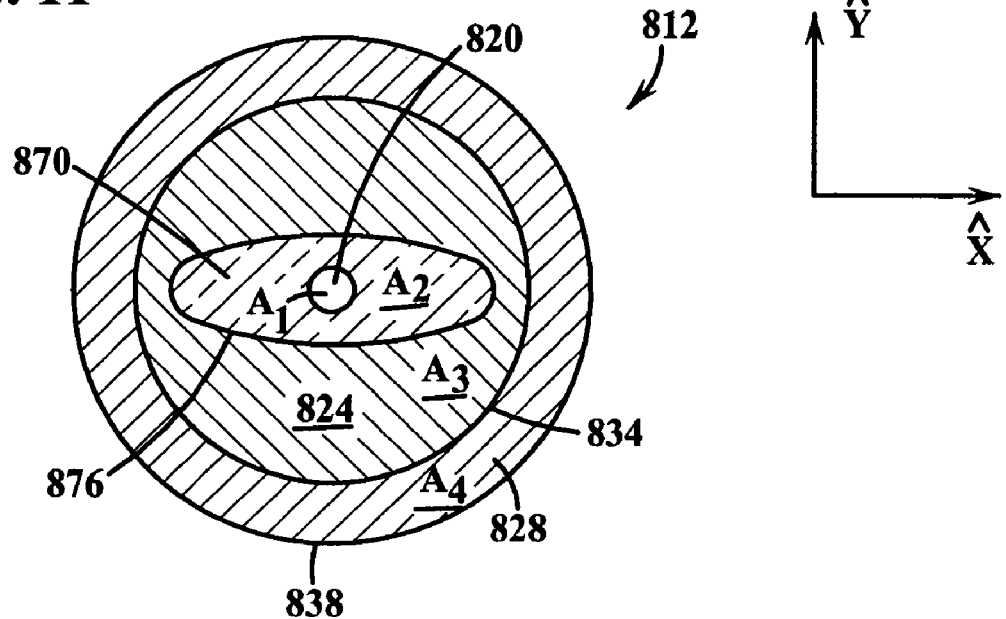
FIG. 11 schematically illustrates a cross section of one more embodiment of an optical fiber according to the present invention.

FIG. 11 schematically illustrates a cross section of another embodiment of a fiber optic article according to the present invention.

The fiber optic article 812 comprises a core 820, an inner region 870 disposed about the core 820, a cladding 824 disposed about the inner region 870, and a second cladding 828 disposed about the cladding 824. The inner region 870 can also be a stress inducing region, such as, for example, by being doped with an appropriate concentration of boron and/or phosphorus, or one or both of the foregoing in conjunction with other materials, such as, for example, germanium or aluminum, for providing the fiber optic article 812 with a selected birefringence, as well as having an appropriate index of refraction for providing the core 820 with a selected NA.

Figure 12:
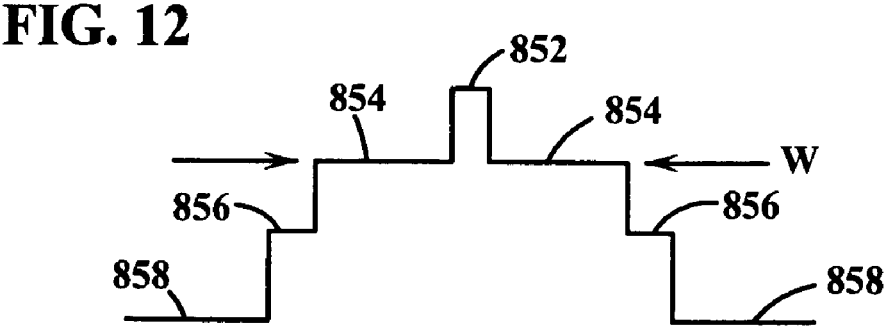
FIG. 12 schematically illustrates one example of a possible index of refraction profile taken across a selected diameter of the cross section of the optical fiber of FIG. 11.

FIG. 12 schematically illustrates one example of an index of refraction profile taken across a selected diameter (e.g., along the x axis) of the cross section of the optical fiber 812 of FIG. 11. The refractive index profile includes a section 852, corresponding generally to the core 820; sections 854, corresponding generally to the inner region 870, sections 856, corresponding generally to the cladding 824, and sections 858, corresponding generally to the second cladding 828. The refractive index profile taken along the y axis is similar, except that the width W shown in FIG. 12 is reduced. Typically the width W along each of the axes is selected such that the inner region serves as a cladding for the core 820 and the core can support at least one, and preferably multiple modes.

FIGS. 10 and 11 illustrate cross sectional areas $A_1$, $A_2$, $A_3$ and $A_4$, which can be defined as indicated in conjunction with the discussion of FIGS. 1 and 3A.

Several embodiments of the invention are described above. In general, it is understood that features described in conjunction with one embodiment can be included in any other embodiment described herein, excepting of course combinations of features that include mutually exclusive features.

Additional features of a fiber optic article according to the invention, such as the fiber optical articles described in conjunction with the FIGURES herein, are now described below.

V-number can be a useful parameter with respect to an optical fiber. V-number can be described by a simple formula for most fibers:

$$V = (NA \times \text{radius of the core} \times 2\pi) / \text{free space wavelength of light}$$

For a fiber having a core with a step refractive index profile relative to the cladding, a V-number of greater than 2.405 is generally understood in the art to correspond to a fiber core that can support or propagate more than one mode. Generally speaking, the higher the V-number, the higher the number of modes the fiber (e.g., the core of the fiber) can propagate.

A core of a fiber according to the invention can comprise a V-number at a first wavelength of greater than 2.405 and the core can comprise a numerical aperture (NA) of less than 0.12. The V-number can be at least 3, at least 4, at least 5 or at least 6. The NA can be less than 0.06. The V number can be the V number at an operating wavelength of the optical fiber, such as for example, a wavelength wherein a active material included in the fiber provides light for amplification or lasing. A typical operating wavelength is about 1550 nm, such as when the active material includes erbium.

In one practice, the invention includes a length of fiber having a core having a V-number at the wavelength at which the active material (e.g., a rare earth) provides light responsive to being pumped of no less than 3; no less than 3.5; no less than 4.0; no less than 4.5; no less than 5; no less than 7.5; and no less than 10. In some practices of the invention the V-number is no greater than 3; no greater than 3.5; no greater than 4; no greater than 4.5 no greater than 5; no greater than 7.5; and no greater than 10. The V-number can be from 3 to 5; from 5 to 7; from 7 to 10; from 3 to 10; from 5 to 10; from 7 to 10; and from 3 to 8.

The core of a fiber according to the invention (e.g., a fiber as shown in FIGS. 1–12) can have a diameter (e.g., $D_{core}$ in FIG. 1) of at least 10 microns; at least 15 microns; at least 25 microns; at least 40 microns; at least 60 microns; at least 80 microns; and at least 90 microns. Other useful ranges for a core diameter include from 10 microns to 100 microns; from 20 microns to 90 microns; from 25 microns to 85 microns; from 30 microns to 80 microns; and from 40 microns to 70 microns.

In various embodiments of the invention, the birefringence of a fiber according to the present invention (birefringence can be the birefringence of the fiber at the first wavelength or, in other practice of the invention can be the birefringence as measured at 633 nm) can be no less than $1 \times 10^{-4}$; no less than $1.5 \times 10^{-4}$; no less than $2 \times 10^{-4}$; no less than $3 \times 10^{-4}$; no less than $4 \times 10^{-4}$; no less than $5 \times 10^{-4}$; or no less than $6 \times 10^{-4}$. Alternatively, the birefringence can be no greater than $1 \times 10^{-4}$; no greater than $1.5 \times 10^{-4}$; no greater than $2 \times 10^{-4}$; no greater than $3 \times 10^{-4}$; no greater than $4 \times 10^{-4}$; no greater than; no greater than $5 \times 10^{-4}$; or no greater than $6 \times 10^{-4}$. The birefringence can be from $1 \times 10^{-4}$ to $6 \times 10^{-4}$, or from $1 \times 10^{-4}$ to $3 \times 10^{-4}$, or from $3 \times 10^{-4}$ to $6 \times 10^{-4}$, or from $2 \times 10^{-4}$ to $5 \times 10^{-4}$.

Birefringence is related to beat length by the following formula:

$$\text{Beat length} = (\text{free space wavelength}) / (\text{birefringence})$$

Where the birefringence refers to the difference in refractive index for orthogonal polarizations of light (e.g., difference between refractive indices for slow axis and fast axis polarizations).

Ranges of useful beat lengths (beat lengths are for 633 nm) are as follows: in one practice of the invention, the beat length is no less than 0.5 mm; no less than 0.75 mm; no less than 1 mm; greater than 1 mm; no less than 1.5 mm; no less than 2 mm; no less than 2.5 mm; no less than 3 mm; and no less than 5 mm. Beat lengths can also be no greater than 0.5 mm; no greater than 1 mm; no greater than 1.5 mm; no greater than 2 mm; no greater than 2.5 mm; no greater than 3 mm; and no greater than 5 mm.

Other ranges include beat lengths from 0.5 mm to 0.9 mm; from 0.5 mm to 1.5 mm; from 0.5 mm to 2 mm; from 0.5 mm to 2.5 mm; from 0.5 mm to 3 mm; and from 0.5 mm to 5 mm. Beat lengths can be from 1 mm to 5 mm, from greater than 1 mm to 5 mm; from 1.5 mm to 5 mm; from 2 mm to 5 mm; from 2.5 mm to 5 mm; and from 3 mm to 5 mm.

Certain exemplary refractive index profiles that can be useful in fibers according to the invention are shown above. These refractive index profiles are idealized. Actual refractive index profiles measured on a preform or from an actual optical fiber drawn from the preform can include other features, as is well known in the art, such as rounded edges between sections and the signature "dip" in the index of refraction of the core due to the burnoff of dopants in the core during the collapse stage of the MCVD process (assuming that the MCVD process is used to fabricate the optical fiber preform). Also, each of the sections of the refractive index profile corresponding to a particular region of the fiber indicates that the index of refraction is substantially constant for the region. This need not be true in all practices of the invention. As is well known in the art the index of refraction of a section, such as, for example, a section (e.g., section 252 of FIG. 4 corresponding to the core 220 of FIG. 3A) need not be constant. The index of refraction can be varied according to a predetermined function to provide a particular result. For example, it is known in the art to provide a core comprising a graded refractive index profile, where the profile corresponds to a parabola or other suitable function. As used herein, the use of open language (e.g., comprise, have, include, etc.) in conjunction with describing the index of refraction of a region (e.g., a region has an index of refraction n) does not mean that the index of refraction of the region need be constant throughout the region.

Note that, as described herein, a first region (e.g., a cladding) being "disposed about" a second region (e.g., a core), means that the first region surrounds, at least partially, the second region. Often the first region will surround the second region, and will contact the second region.

One of ordinary skill in the art understands that a material or element can be combined with or incorporated into another material, such as host material, according to a chemical formulation that depends on materials in question.

For example, when the host material is silica glass, most of the germanium is understood to be typically incorporated as $GeO_2$. Similarly, it is understood that boron is typically incorporated as $B_2O_3$. However, the invention is not limited to glass hosts or silica glass hosts, and can be practiced with other types of materials as host, such as plastics or other types of glasses, such as chalcogenide glasses or fluoride or phosphate glasses, wherein germanium or other elements are incorporated into different compounds than those specifically noted above. Stating that a fiber includes a material, such as boron, for example, means that the material is included in some form in the fiber, where it is understood that the form can be different for different fiber optic articles.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention. For example, a fiber optic article having a core comprising fluorine can also an inner region as described above.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision.

We claim:

1. An optical fiber, comprising:
   a core comprising a host material comprising a concentration of erbium, a concentration of phosphorus, a concentration of ytterbium and a concentration of fluorine for reducing the index of refraction of the host material comprising said concentrations of erbium, phosphorus and ytterbium, said concentration of ytterbium for sensitizing said erbium by absorbing pump light and transferring energy to said erbium, said erbium providing light having a second wavelength different than the wavelength of the pump light;
   a cladding disposed about said core and having inner and outer perimeters spaced by a thickness therebetween, said cladding having an index of refraction that is less than an index of refraction of said core; and wherein said core has a V-number at said second wavelength of greater than 2.405 and a numerical aperture of less than 0.12 relative to said cladding, and said thickness is larger than a thickness of a region, if present, disposed between said cladding and said core.

2. The optical fiber of claim 1 wherein said cladding is a pump cladding for receiving the pump light and wherein said optical fiber includes a second cladding disposed about said cladding.

3. The optical fiber of claim 1 wherein said concentration of fluorine is at least 1% by weight.

4. The optical fiber of claim 1 wherein said V-number is at least 3.

5. The optical fiber of claim 1 wherein said numerical aperture is no greater than 0.09.

6. The optical fiber of claim 1 wherein said core comprises a diameter of at least 12 microns.

7. The optical fiber of claim 1 wherein said core comprises a diameter of at least 15 microns.

8. The optical fiber of claim 1 wherein said core comprises a diameter of at least 25 microns.

9. The optical fiber of claim 1 wherein said core comprises at least 60% by weight of silica.

10. The optical fiber of claim 1 comprising at least one longitudinally extending region for providing said core of said fiber with a selected birefringence at said second wavelength.

11. The optical fiber of claim 10 wherein said selected birefringence is no less than $1\times10^{-4}$.

12. The optical fiber of claim 10 wherein said at least one longitudinally extending region comprises a pair of longitudinally extending regions each having a substantially circular outer perimeter, said cladding having a substantially circular outer perimeter and being a pump cladding for receiving the pump light, and said optical fiber comprising a second cladding disposed about said cladding.

13. The optical fiber of claim 12 wherein said selected birefringence is no less than $1\times10^{-4}$.

14. The optical fiber of claim 1 comprising said region disposed between said cladding and said core, said region having an index of refraction that is less than an index of refraction of said core and wherein said cladding comprises an index of refraction that is less than said index of refraction of said region.

15. The optical fiber of claim 14 comprising at least one longitudinally extending region for providing said core of said fiber with a selected birefringence at said second wavelength.

16. The optical fiber of claim 14 wherein said region has a non-circular outer perimeter.

* * * * *

UNITED STATES PATENT AND TRADEMARK OFFICE
CERTIFICATE OF CORRECTION

PATENT NO. : 7,062,137 B2  Page 1 of 1
APPLICATION NO. : 10/912666
DATED : June 13, 2006
INVENTOR(S) : Farroni et al.

It is certified that error appears in the above-identified patent and that said Letters Patent is hereby corrected as shown below:

At column 1, line 3 (after the title and before the heading "FIELD OF THE INVENTION"), insert the following paragraph:

--This invention was made with Government support under Contract No. FA9451-05-D-0218 awarded by the U.S. Air Force. The Government has certain rights in the invention.--

Signed and Sealed this

First Day of July, 2008

JON W. DUDAS
*Director of the United States Patent and Trademark Office*